United States Patent

[11] 3,623,992

| | | |
|---|---|---|
| [72] | Inventor | Richard Kolasinski<br>Richmond, Mich. |
| [21] | Appl. No. | 42,470 |
| [22] | Filed | June 1, 1970 |
| [45] | Patented | Nov. 30, 1971 |
| [73] | Assignee | Diamond Crystal Salt Company<br>St. Clair, Mich. |

[54] ROCK SALT COMPOSITION AND METHOD
8 Claims, No Drawings

[52] U.S. Cl. .................................................. 252/182,
23/50 BE, 23/89, 210/30, 210/32, 252/70,
252/179, 252/385, 260/2.1 R, 260/DIG. 5,
260/DIG. 6
[51] Int. Cl. ..................................................... C01d 3/22,
C02b 1/48, C02b 1/76
[50] Field of Search .......................................... 252/182,
179, 385, 70; 260/2.1 R, 2.1 M, DIG. 5, DIG. 6;
210/30, 32; 23/89, 50 BE

[56] References Cited
UNITED STATES PATENTS

| 2,769,787 | 11/1956 | Diamond..................... | 210/32 |
| 2,749,306 | 6/1956 | Coleman..................... | 252/179 |
| 3,078,224 | 2/1963 | Schulze et al................ | 210/32 |
| 3,139,401 | 6/1964 | Hach........................... | 210/30 |
| 3,262,883 | 7/1964 | Fisher......................... | 210/30 |

*Primary Examiner*—Richard D. Lovering
*Assistant Examiner*—Irwin Gluck
*Attorney*—Harness, Dickey & Pierce

ABSTRACT: A rock salt product for rejuvenating fouled ion exchange resin beds, said rock salt having a particle size within the range from about No. 8 U.S. standard screen size to about five-eighths inches U.S. standard screen size, comprising, in weight percent, about 0.1 percent to about 0.5 percent sodium bisulfate, about 0.1 percent to about 0.5 percent monosodium phosphate, about 0.1 percent to about 0.5 percent water, and a balance of said rock salt.

ROCK SALT COMPOSITION AND METHOD

BACKGROUND OF THE INVENTION

The present invention relates to a new rock salt product which is particularly useful in rejuvenating and regenerating fouled ion exchange resins and to the method of making and using this new rock salt product.

It is conventional and well known in regard to the softening of water that many water supplies contain soluble and insoluble iron in addition to the compounds of calcium, magnesium and the like which cause hardness. It is also well known that iron-bearing waters favor the growth of iron bacteria, known as iron crenothrix. These growths form abundantly in water mains, recirculating systems and in water softener ion exchange beds, and ultimately exert a clogging action and cause reduction in flow rates of the water in such systems. Quite often the bacterial growths break loose in large masses, or may decay to cause bad taste and odors in the water. Many commercial installations are equipped with means for converting soluble iron to insoluble iron and then removing the iron precipitate from the water by filtration. Such filtration equipment is expensive and is not to be found in small commercial and in domestic or household installation for water purification and softening. In these latter instances the water is softened and the iron is removed by the use of exchange resin beds. While ion exchange resins are satisfactory for removing low concentrations of iron from raw water, difficulty is often encountered after a period of time because iron ordinarily accumulates in the iron exchange resin upon continued use even though conventional regeneration procedures are employed. In such cases, it is known that the regeneration of the resin is partially unsuccessful because of the irreversible oxidation of iron within the resin bed which occurs with the passage of time.

Certain procedures which are known for eliminating iron from water include the addition of hydrochloric acid to the water, and this procedure is adaptable for commercial use but the difficulty of handling the material and its corrosive attack on household equipment makes it unsuitable for use in domestic installations. Iron may also be removed by the use of sodium hydrosulfite which reduces the iron and allows it to be removed from the water, but this method is accompanied by the disadvantage that sodium hydrosulfite creates gases which have an obnoxious odor and is an unstable material which is susceptible to spontaneous ignition in the presence of large amounts of moisture which may become adsorbed on it. Iron may also be removed by the use of chelating agents of either the inorganic type such as phosphate derivatives or the organic type such as ethylene diamine tetra acetic acids. The use of chelating agents in expensive and slower than the use of hydrosulfites and for this reason has not attained the widespread acceptance, thus the known procedures and materials which are in use for restoring spent ion exchange resins to clean regenerated form still leave much to be desired.

PRIOR ART REFERENCES

The prior art discloses an acid-containing compressed salt product for removing iron from water conditioner resin beds in U.S. Pat. No. 3,216,932, issued to J. F. Heiss and R. Kolasinski. Other references cited here in the nature of showing state of the art are U.S. Pat. Nos. 2,854,477; 2,977,313; 2,990,375; 3,078,224; 3,083,166; and, 3,110,683. However, in addition to compressed slat, rock salt is frequently used for regenerating water softeners, and manufacturing a rock salt product with additives such as those described in U.S. Pat. No. 3,216,932 has presented difficulties and problems in the past which had not been solved in any satisfactory manner until the discovery of the invention was made as described herein. The discovery which underlies this invention is based in part on the finding that if a liquid acid is used at the proper level in a rock salt product for removing iron from water conditioner resin beds then it drops off the rock salt and forms a pool in the bottom of the bag. On the other hand it was discovered that if a solid acid salt is attempted for this use then the difference in size between the acid salt particles and the rock salt particles causes extreme segregation. Still further it was found that if one were to increase the size of the additive particles in order to reduce segregation, the small amount of additive present would have to be concentrated in one area of this salt causing a nonuniform product; whereas, on the other hand, reducing the size of the salt particles would result in a uniform product but a fine rock salt is not acceptable to the water conditioning trade for numerous reasons.

Many a adhesive-type agents have been used to make additives of various types adhere to rock salt used for ice and snow removal but the use of these additives for resin bed regeneration is not advisable, and in fact it is detrimental because of the danger of plugging the resin bed.

Accordingly, it is a primary object of this invention to provide a new rock salt product which contains an agent capable of rejuvenating the fouled ion exchange resins, with said rock salt being defined as having a particle size range from approximately No. 8 U.S. standard screen size up to about five-eighths inch U.S. standard screen size.

Another object of this invention is to provide a new rock salt material, wherein the rock salt has a particle size within the range of approximately No. 8 U.S. standard screen size up to about five-eighths inch U.S. standard screen size, with said material being capable of simultaneously rejuvenating fouled ion exchange resins and regenerating those resins.

Other objects, features and advantages of the present invention will become apparent from the subsequent description and the appended claims.

SUMMARY OF THE INVENTION

Briefly stated, this invention comprises a rock salt composition, said rock salt having a particle size within the range from about No. 8 U.S. screen size to about five-eighths inch U.S. screen size, said composition comprising, in weight percent, about 0.1 percent to about 0.5 percent sodium bisulfate, about 0.1 percent to about 0.5 monosodium phosphate, about 0.1 percent to about 0.5 percent water, and a balance of said rock salt.

From a method aspect, briefly stated, this invention comprises a method of preparing a rock salt composition, said rock salt having a particle size within the range from about No. 8 U.S. screen size to about five-eighths inch U.S. screen size, said composition comprising, in weight percent, about 0.1 percent to about 0.5 percent sodium bisulfate, about 0.1 percent to about 0.5 percent monosodium phosphate, about 0.1 to about 0.5 percent water, and a balance of said rock salt, said method comprising the steps of: mixing said water and rock salt together such that the water is generally uniformly dispersed on the salt, mixing said sodium bisulfate and monosodium phosphate in with said salt composition.

DESCRIPTION

It has now been discovered that a highly unique and highly satisfactory commercial product of the iron removing rock salt type can be made by critically controlling the moisture content of the rock salt, for example, using a coarse Louisiana rock salt having the physical properties set forth in table 1 below, an iron-removing water-conditioning rock salt containing 0.22 percent by weight sodium bisulfate, 0.22 percent by weight monosodium phosphate with water at the 0.1 percent, 0.2 percent, 0.3 percent and 0.5 percent by weight levels was blended. These four compositions are specifically described in examples 1–4 below.

|  | % By Weight | | |
|---|---|---|---|
| Rock Salt (Table 1 Type) | Sodium Bisulfate | Monosodium Phosphate | Water |
| Example 1   Balance | 0.22 | 0.22 | 0.1 |
| Example 2   Balance | 0.22 | 0.22 | 0.2 |
| Example 3   Balance | 0.22 | 0.22 | 0.3 |
| Example 4   Balance | 0.22 | 0.22 | 0.5 |

TABLE 1

Coarse Rock Salt

Physical Properties

| Screen Sizes. U.S.S. Equiv. | Percent Retained | Percent Passing |
|---|---|---|
| ¾ inch | 0.0 | 100.0 |
| No. 3 | 10.8 | 89.2 |
| No. 4 | 30.4 | 58.8 |
| No. 6 | 34.6 | 24.2 |
| No. 8 | 17.5 | 6.7 |
| No. 10 | 3.9 | 2.8 |
| Pan | 2.8 | |
| Apparent Density | | 68 lbs./cu. ft. |

I discovered as a result that if a rock salt composition is prepared as described in example 1, using a 0.1 percent by weight level of water, then about 10 percent of the additive materials sodium bisulfate and monosodium phosphate segregated from the composition, and thus from this I have concluded that the lower limit of the water level present in the rock salt product of my invention should be no lower than 0.1 percent by weight. Furthermore the rock salt product prepared as described in example 4, using a water level of 0.5 percent by weight, was satisfactory but that it was slightly damp and, thus from this I have concluded that the upper limit for the water level in the composition of my invention should be no higher than 0.5 percent by weight. The product prepared as in examples 2 and 3 were found to be entirely satisfactory.

Thus, if coarse rock salt is used to make the iron removing rock salt product of this invention, the addition of water at 0.1 percent to 0.5 percent by weight will essentially eliminate segregation altogether without making an unduly wet product. However, with the more commonly used extra coarse rock salt, described by the physical properties set forth below in table 2, the moisture content is more critical.

TABLE 2

Extra Coarse Rock Salt

Physical Properties

| U.S. Std. Screen Opening | Percent Retained | Percent Passing |
|---|---|---|
| 0.625 inch | 0.0 | 100.0 |
| 0.438 inch | 9.3 | 91.7 |
| 0.375 inch | 28.6 | 62.1 |
| 0.312 inch | 34.6 | 28.5 |
| 0.265 inch | 16.0 | 11.5 |
| 0.221 inch | 5.7 | 5.8 |
| None | 5.8 | |
| Apparent Density | | 67 lbs./cu. ft. |

For example, using extra coarse rock salt, the following blends were prepared with sodium bisulfate at 0.22 percent, monosodium phosphate at 0.22 percent and water at the 0.1 percent 0.2 percent, 0.3 percent and 0.5 percent by weight levels, as described in examples 5, 6, 7 and 8 below.

| | | % By Weight | | |
|---|---|---|---|---|
| | Rock Salt (Table 2 Type) | Sodium Bisulfate | Monosodium Phosphate | Water |
| Example 5 | Balance | 0.22 | 0.22 | 0.1 |
| Example 6 | Balance | 0.22 | 0.22 | 0.2 |
| Example 7 | Balance | 0.22 | 0.22 | 0.3 |
| Example 8 | Balance | 0.22 | 0.22 | 0.5 |

The results obtained with examples 5–8 were as follows, as set forth in table 3.

TABLE 3

| | |
|---|---|
| Water at 0.1% | About 25% of additive segregated. |
| Water at 0.2% | Satisfactory product. |
| Water at 0.3% | Satisfactory product. |
| Water at 0.5% | Less satisfactory product, quite wet, accumulation of water in container after a period of time. |

Thus, from the results of table 3 I found that while a moisture level, ranging from between 0.1 and 0.5 percent by weight can be used for coarse rock salt of the general type described in table 1, that when extra coarse rock salt is used, as of the general type described in table 2, then the finished additive-containing rock salt product should preferably have a slightly narrowed water content range, that is, the water level for the extra rock salt type of product in accordance with this invention I discovered should be within the range of approximately 0.15 percent to about 0.4 percent by weight water.

Additional examples of composition in accordance with the invention are:

| | | % By Weight | | |
|---|---|---|---|---|
| | Rock Salt | Sodium Bisulfate | Monosodium Phosphate | Water |
| Example 9 | Balance (Table 1 Type) | 0.1 | 0.1 | 0.2 |
| Example 10 | Balance (Table 1 Type) | 0.5 | 0.5 | 0.4 |
| Example 11 | Balance (Table 1 Type) | 0.3 | 0.3 | 0.3 |
| Example 12 | Balance (Table 2 Type) | 0.1 | 0.1 | 0.2 |
| Example 13 | Balance (Table 2 Type) | 0.5 | 0.5 | 0.3 |
| Example 14 | Balance | 0.3 | 0.3 | 0.3 |

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A rock salt composition,
    said rock salt having a particle size within the range from about No. 8 U.S. standard screen size to about five-eighth inches U.S. standard, screen size,
    said composition comprising, in weight percent,
    about 0.1 percent to about 0.5 percent sodium bisulfate,
    about 0.1 percent to about 0.5 percent monosodium phosphate,
    about 0.1 percent to about 0.5 percent water, and
    a balance of said rock salt.
2. The composition of claim 1 wherein
    said sodium bisulfate is present from about 0.1 percent to about 0.3 percent,
    said monosodium phosphate is present from about 0.1 percent to about 0.3 percent.
3. The composition of claim 1 wherein
    said water is present from about 0.15 percent to about 0.4 percent.
4. The composition of claim 2 wherein
    said water is present from about 0.15 percent to about 0.4 percent.
5. A method of preparing a rock salt composition, said rock salt having a particle size within the range from about No. 8 U.S. standard screen to about five-eighths inches U.S. standard screen size,
said composition comprising, in weight percent,
about 0.1 percent to about 0.5 percent sodium bisulfate,
about 0.1 percent to about 0.5 percent monosodium phosphate,
about 0.1 percent to about 0.5 percent water, and
a balance of said rock salt,
said method comprising the steps of:
mixing said water and rock salt together such that the water is generally uniformly dispersed on the salt,
mixing said sodium bisulfate and monosodium phosphate in with said salt composition.

6. The method of claim 5 wherein
said sodium bisulfate is present from about 0.1 percent to about 0.3 percent,
said monosodium phosphate is present from about 0.1 percent to about 0.3 percent.

7. The method of claim 5 wherein
said water is present from about 0.15 percent to about 0.4 percent.

8. The method of claim 6 wherein
said water is present from about 0.15 percent to about 0.4 percent.

* * * * *